United States Patent [19]

Notarianni et al.

[11] 4,145,993

[45] Mar. 27, 1979

[54] PIGLET SAVER

[76] Inventors: David Notarianni, 230 Phoenix Ave., Apt. #13; George H. Martin, 109 Rockwood Ave., both of Cranston, R.I. 02920

[21] Appl. No.: 824,846

[22] Filed: Aug. 15, 1977

[51] Int. Cl.$^2$ .............................................. A01K 1/02
[52] U.S. Cl. ..................................................... 119/20
[58] Field of Search ................................... 119/20, 16

[56] References Cited

U.S. PATENT DOCUMENTS

| 436,902 | 9/1890 | Osborn | 119/16 |
|---|---|---|---|
| 2,602,419 | 7/1952 | Johnson | 119/16 |
| 2,688,308 | 9/1954 | Hines | 119/20 |
| 3,276,429 | 10/1966 | Johnson | 119/20 |

Primary Examiner—Louis G. Mancene
Assistant Examiner—Daniel J. Leach
Attorney, Agent, or Firm—Salter & Michaelson

[57] ABSTRACT

A farrowing apparatus intended to prevent piglets from being crushed by their mother sow in which two adjacent chambers are provided for the piglets and the sow respectively. The sow is so confined that she may either stand up or lie down on her side in a suckling position. An opening is provided between the chambers so that the piglets can reach the sow when she is lying down. The opening is adapted to be closed by a gate normally biased to a closed position. A pivotally mounted lever contacts the gate and projects into the sow's compartment and extends beneath the sow so that when she lies down, the lever will be depressed to force the gate to an open position, thus permitting access of the piglets to the sow's chamber to nurse, but should the sow subsequently stand, the lever automatically moves to its upper position thus permitting the gate to quickly close. The closing of the gate forcibly ejects the piglets from the sow's chamber back into their own compartment whereby no possibility exists of piglets being crushed when the sow again lies down.

10 Claims, 3 Drawing Figures

PIGLET SAVER

BACKGROUND OF THE INVENTION

This invention relates to an animal pen and more particularly to a farrowing apparatus wherein suckling pigs and their mother sow are confined so as to eliminate or substantially reduce the chance of piglets being crushed under the sow when the latter lies down.

The protection of young suckling pigs from injury due to movement of their sow is a well-known problem, and numerous attempts have been made to provide housing or farrowing structures which afford such protection. Several patents which generally deal with this problem include: U.S. Pat. Nos. 2,602,419 to Johnson; 2,688,308 to Hines; 3,084,668 to McMurray et al; 3,276,429 to Johnson; and 3,884,188 to Arends. One approach of such prior art structures is to always maintain the piglets in a separate compartment from the sow, such as in U.S. Pat. Nos. 3,884,188 and 3,276,429. Another solution such as indicated by U.S. Pat. Nos. 2,602,419 and 3,084,668 is to provide special means for permitting the piglets to enter the sow's pen only in certain areas thereof where they will be protected from being crushed. The citation of the above patents and their discussion where believed appropriate constitutes applicant's prior art statement.

Despite the above, there still remains the problem of preventing piglets from being crushed, while simultaneously permitting enough access of the piglets to the sow so they can properly nurse.

It is therefore a primary object of this invention to provide an improved farrowing apparatus in which proper access of the piglets to the sow is permitted when she is in a lying down nursing position and which simultaneously prevents such access when the sow is in a standing position.

A further object of the invention is the provision of a farrowing apparatus which may be easily and simply incorporated into existing farrowing structures.

A still further object of the present invention is the provision of an improved farrowing apparatus which while granting access to the piglets to the sow's chamber to nurse, will forcibly eject the piglets from that chamber when the sow moves from a lying to a standing position.

These and other objects of the invention are accomplished by provision of adjacent sow and piglet chambers separated by an opening which opening is normally closed by a spring biased gate. The gate in turn is contacted by a lever projecting at one end thereof into the sow's chamber and in contact with her under portions so that she is in a lying down or nursing position the lever will force the gate to pivot downwardly to a lower open position so that the piglets may move from their compartment onto the lowered gate whereupon the piglets have access to the sow for nursing. When the sow subsequently moves to a standing position, the lever automatically raises and permits the gate to be urged, by its spring bias, to a closed position, which action simultaneously forces or ejects the piglets back into their own compartment.

Other objects, features, and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figure 1:
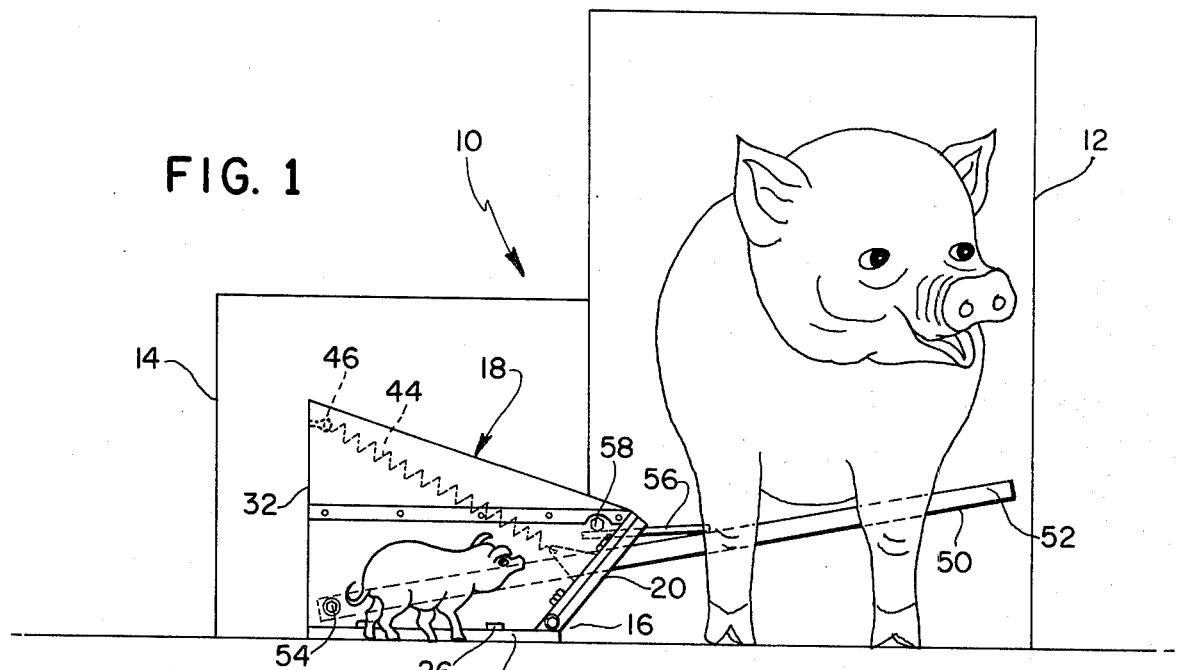
FIG. 1 is a front elevational view showing the farrowing apparatus of the present invention including a pen or chamber for confining the sow and an adjacent piglet pen or chamber.

Turning now to the drawing and in particular to FIG. 1 thereof, the overall format of the farrowing apparatus of the present invention is illustrated. Such apparatus 10 comprises a first chamber 12 for confining a sow and a second chamber 14 for confining a plurality of piglets. The configuration and dimensioning of the chamber 12 is such that the sow cannot move forward or to the rear to any substantial extent and cannot turn around; her movement being substantially confined to the standing position shown or a lying down suckling position. On the other hand, the structure of the piglet compartment 14 is such as to enable the piglets any desired degree of movement, to protect them from the elements, and to provide a secure place separate from the sow when she is in a standing position so that they cannot get underneath her and be crushed if she lies down. Also, while one piglet compartment 14 is shown adjacent the side of the sow compartment 12, it should be clear that another piglet compartment may be positioned on the other side thereof. The construction of both the compartments 12, 14 may be of any suitable material such as wood, plastic, metal or the like.

An opening 16 is disposed between the chambers 12 and 14 and through such opening the piglets may move from their compartment into the sow's compartment for suckling when she is in a lying down position. Such opening is normally closed by an assembly 18 including a gate 20 pivotally connected as at 21 to the assembly base 22 and at the other end thereof free to move between open and closed positions with respect to the opening 16. The assembly 18 further includes a pair of generally parallel spaced walls 24 upstanding from the base 22 and secured thereto by any suitable means (not shown). The assembly base 22 may be secured to the floor of the piglet compartment 14 by means of bolts 26.

Figure 3:
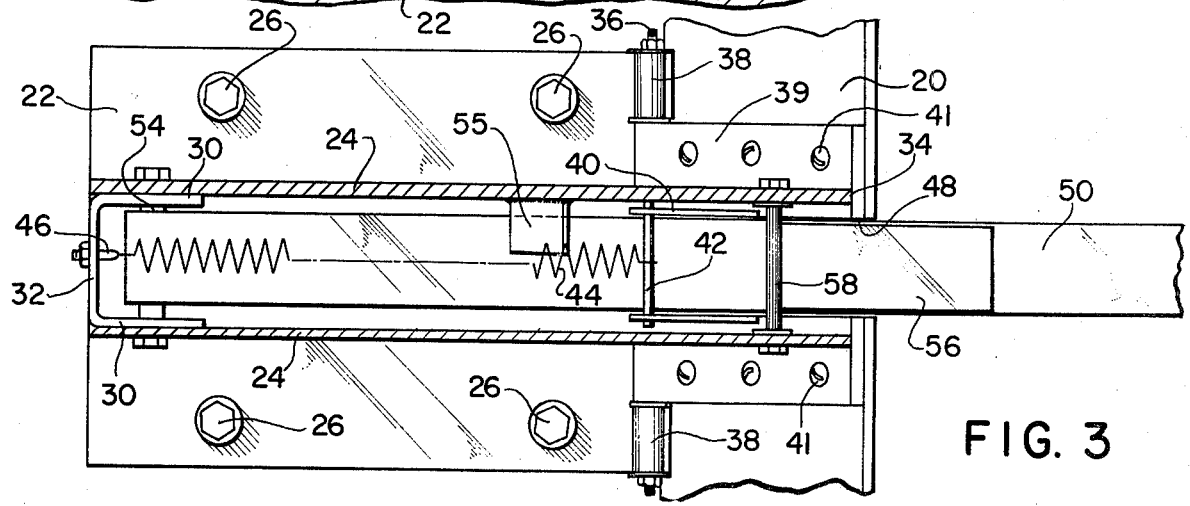
FIG. 3 is a top plan view of the device shown in FIG. 2 in its closed position.

The walls 24 may be held in spaced relationship by an upstanding generally U-shaped collar or support 28 having in turn sidewalls 30 and a connecting base wall 32. The other end of the walls 24 terminate in forward edges 34 against which rear portions of gate 20 are adapted to engage so as to form an upper stop for the gate in its upward closed position. The lower edge of the gate is pivotally connected to the assembly 18 as at 21 by pins 36 outwardly projecting from either side thereof into bushings 38 adapted to receive such pins and in turn suitably connected to the base 22. Specifically, the pins 36 are carried by bracket 39 which is attached to gate 20 by screws 41, as shown most clearly in FIG. 3. Accordingly, the gate 20 is adapted for pivotal movement towards and away from the opening 16 to open and close the same.

A pair of spaced generally triangular configured plates 40 upwardly project from the rear of the gate 20 and are connected at their upper apex by means of a laterally extending rod 42. A spring 44 is in turn connected to the rod 42 at one end thereof and at the other end thereof to the base 32 of the collar 28 as by means of an eyelet 46. The spring 44 is such that it is under tension at all times and accordingly continuously urges the gate 20 to an upper or closed position against the side edges 34 of the walls 24. In such position it should be clear that the piglets cannot move through the opening 16 and are thus prevented from having access to the first chamber 12 in which the sow is located.

The upper edge of the gate 20 is provided with an downwardly extending notch 48 in which a generally flat elongated lever 50 is adapted to rest at intermediate portions thereof. The lever 50 includes a forward end 52 which projects into the first compartment 12 and which portion is adapted to be positioned underneath the sow and laterally extend between her front and rear legs. In some cases it may be necessary or desirable to utilize more than one assembly 18 and in such cases two or more levers 50 are utilized each of which is adapted to be positioned beneath the sow. The other end of the lever 50 is pivotally attached to the walls 24 as by means of a bolt 54 extending therethrough or otherwise attached thereto and in turn extending through the sides 30 and walls 24. The lever 50 is normally under no tension or bias in either direction although in order to limit its upward movement, a plate 55 may be secured to one of the walls 24 and acts as a stop. A plate 56 is connected to a shaft 58 spanning the walls 24 and connected thereto, said plate resting on lever 50, whereby when the latter is in its lower position, the plate acts as a shield or baffle to prevent access of the piglets into the area between walls 24.

Figure 2:
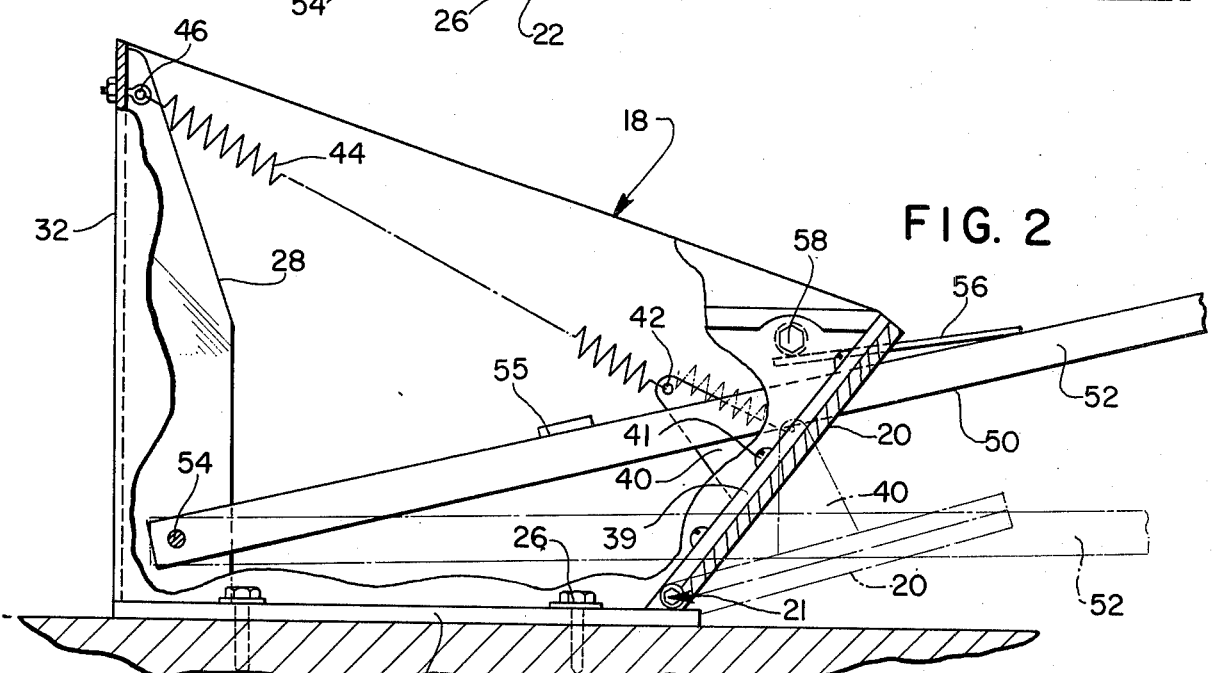
FIG. 2 is a side sectional view of such apparatus on an enlarged scale and showing the closed position thereof in solid lines and the open or suckling position thereof in phantom lines.

As best illustrated in FIG. 2 of the drawing by the phantom line representation thereof, when the sow moves from a standing to a lying position she will urge the lever 50 downwardly which in turn, by reason of its contact with portions of the notch 48, will force the gate or platform 20 to its lower open or horizontal position, against the action of the tension spring. In such position, the opening 16 is now uncovered and the piglets may move through such opening onto the now horizontal platform 20 to nurse from the sow who is, as above indicated, now in a suckling position lying on her side. During such suckling activity the piglets are positioned on the platform or gate 20, it being clear that the latter forwardly extends to a significant extent into the first chamber 12. Thereafter, in the event that the sow moves from such lying or suckling position to a standing position, where she might endanger the piglets, the lever is now free to upwardly move to its position shown in FIG. 1 and the solid lines of FIG. 2. Such lever movement is actually initiated by the action of the spring 44 which quickly urges or upwardly forces the platform or gate 20 to its upper or closed position with regard to the opening 16. Inasmuch as the piglets are positioned on the platform prior to such action, such action forcibly ejects them back into their own compartment 14. Obviously, the tension of the spring 44 is calibrated to achieve the necessary tension to accomplish such results.

Furthermore, in order to protect the piglets from the aforementioned spring and lever action, the walls 24 upwardly extend from the base 22 a significant height so that piglets are blocked from entering the area where the lever 50 is mounted, thus preventing the piglets from being crushed by the lever when the sow moves to a lying position.

It is therefore believed that a new and novel device is presented by the present invention, and one which operates in a manner entirely different from prior art structures. More specifically, a device is now provided wherein the very movements of the sow which may endanger the piglets triggers movement of the piglets to a safe position. It should also be clear that once the sow has moved from a lying to a standing position, the piglets may not have access to the sow's compartment until she again moves to a lying down position at a later time. Accordingly, the piglets are not only protected while suckling by the fact that the sow's chamber is so dimensioned that when the sow is lying down, there is insufficient room for her to move enough to endanger the piglets, but also by the fact that when she stands, such movement actuates the assembly 18 so as to forcibly remove them from danger.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Apparatus for farrowing suckling piglets comprising a first chamber adapted to receive and confine a sow, said chamber dimensioned so as to generally confine said sow to alternate first lying down and second standing positions, a second chamber adjacent said first chamber and adapted to receive and confine said piglets, an opening between said chambers for permitting nursing access to the underside of said sow by said piglets when the sow is in said first lying down position, a gate, first means normally biasing said gate to close said opening, said gate adapted when open, to support said piglets thereon when the latter are suckling, and second means for moving said gate between said closed and open positions, said second means projecting into said first chamber and adapted to extend beneath said sow, whereby movement of said sow to standing position enables said first means to close said gate and movement of said sow to lying down position causes said second means to open said gate.

2. The apparatus of claim 1, said gate pivotally disposed to move upwardly to close said opening and simultaneously urge said suckling piglets supported thereon into said second chamber, said gate projecting into said first chamber in said open position thereof.

3. The apparatus of claim 2, said first means comprising a spring continuously urging said gate to its upper closed position.

4. The apparatus of claim 3, said second means comprising a lever positioned for pivotal movement at one end thereof and projecting into said first chamber at the other end thereof, said other end adapted for contact with under portions of said sow, said lever contacting said gate at an intermediate portion whereby movement of said sow to lie down forces said other lever end downward thus causing said gate to open against the action of said spring, and whereby movement of said sow to a standing position permits said other lever end to move upwardly thus enabling said spring to urge said gate to its closed position.

5. The apparatus of claim 4, said gate having a centrally disposed downwardly extending notch in the forward edge thereof, said notch adapted to receive said lever.

6. The apparatus of claim 4, said second compartment having a pair of upwardly extending centrally disposed walls between which said lever and said spring are disposed, said walls blocking piglets from access to said lever and spring assembly.

7. The apparatus of claim 6, said lever first end pivotally supported from lower rear end portions of said walls and said spring being a tension spring attached at one end to said gate and at the other end thereof proximal to upper portions of said walls, said gate pivotally connected to said walls at its lower edge.

8. The apparatus of claim 1, there being a third chamber disposed on the opposite side of said first chamber.

9. The apparatus of claim 6, the forward edges of said walls adapted for contact with said gate so as to form an upper stop therefor in said closed position thereof.

10. The apparatus of claim 4, there being a pair of said springs and a pair of said levers spaced from each other along the extent of said opening, said pair of levers adapted to laterally extend beneath the sow at points intermediate the front and rear legs thereof.

* * * * *